(12) United States Patent
Heinen

(10) Patent No.: US 8,679,256 B2
(45) Date of Patent: Mar. 25, 2014

(54) METHOD OF TREATING HONEY

(76) Inventor: Dirk Heinen, Edmonton (CA)

( * ) Notice: Subject to any disclaimer, the term of this patent is extended or adjusted under 35 U.S.C. 154(b) by 326 days.

(21) Appl. No.: 13/109,615

(22) Filed: May 17, 2011

(65) Prior Publication Data
US 2012/0291775 A1  Nov. 22, 2012

(51) Int. Cl.
*C13K 13/00* (2006.01)
*A23P 1/00* (2006.01)

(52) U.S. Cl.
USPC .............................................. 127/63; 426/519

(58) Field of Classification Search
None
See application file for complete search history.

(56) References Cited

U.S. PATENT DOCUMENTS 4,004,040 A * 1/1977 Puta .............................. 426/564

* cited by examiner

*Primary Examiner* — Melvin C Mayes
*Assistant Examiner* — Stefanie Cohen
(74) *Attorney, Agent, or Firm* — Adrian D. Battison; Ade & Company Inc.

(57) ABSTRACT

A soft, spreadable honey product is formed by feeding the honey in raw solid form through a side feed chute into a container defined by a vertical rotating auger with a clearance between the flight and the container. The auger flight drives the material to one discharge end of the container with a closed discharge valve at the discharge end to cause the honey to be admixed within the container and the crystals to fracture and to interact with one another so as to grind them down making them smooth and small. The mixing action is carried out until the crystals in the honey are broken down sufficiently to form the honey into the soft, spreadable honey product and carried out without the use of any heat at any time and without filtering the product.

9 Claims, 3 Drawing Sheets

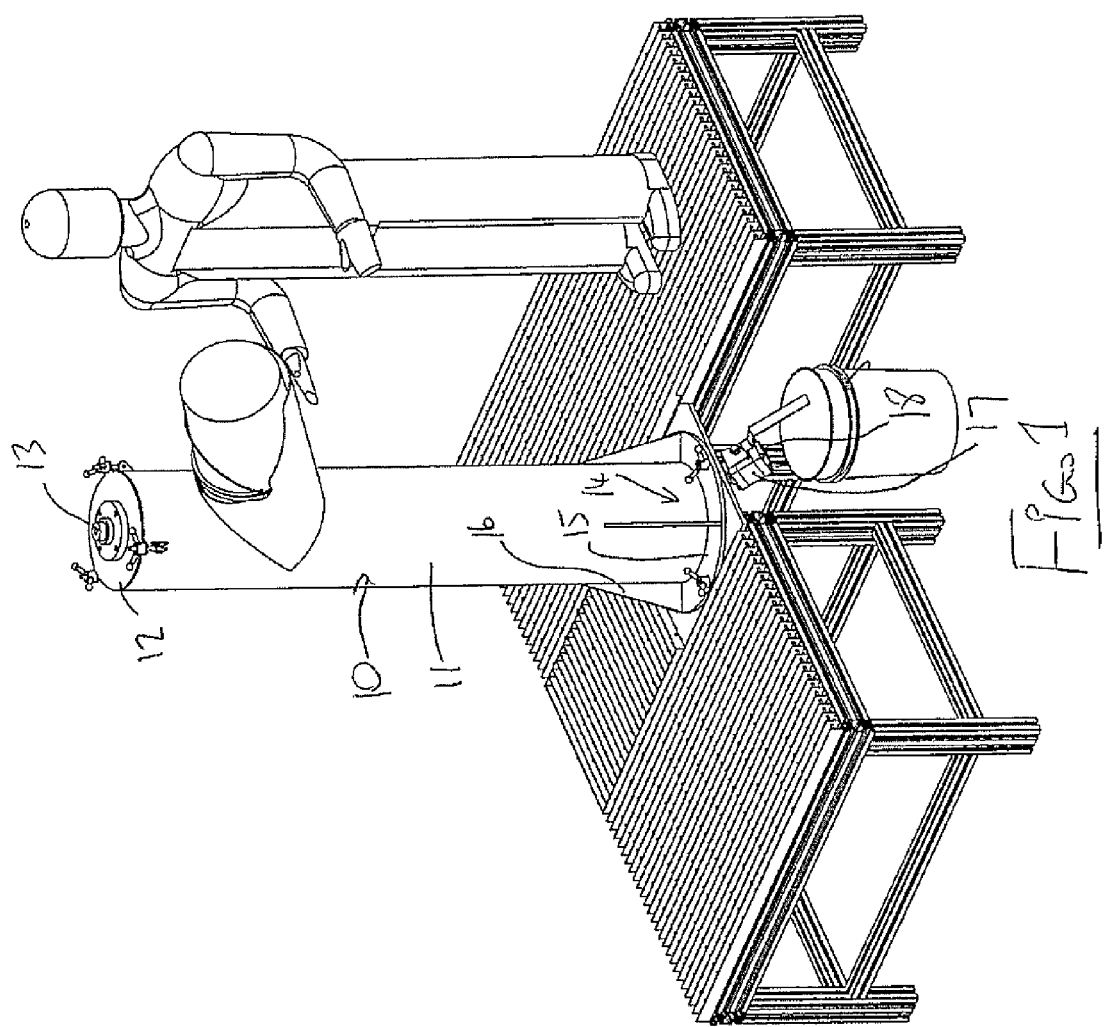

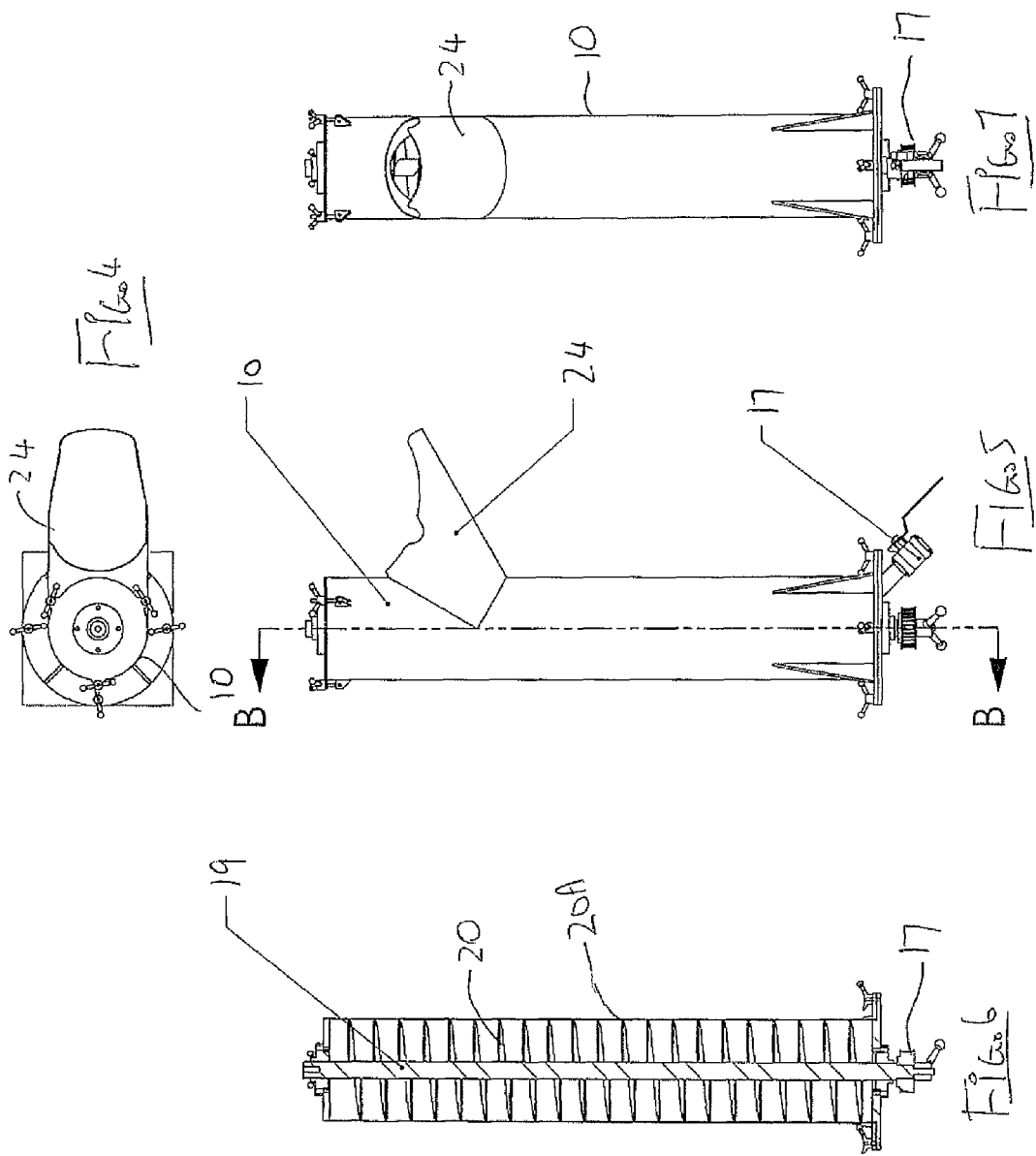

METHOD OF TREATING HONEY

This invention relates to a method for treating honey to form a smooth spreadable product without use of heat.

BACKGROUND OF THE INVENTION

In nature, nectar is collected by bees from the flowering plant and brought back to the hive as a liquid and converted into honey. In this process it is stored in cells and covered to preserve it. Honey farmers collect the honey from the hives and extract it as a liquid and store it in 45 gallon barrels that are then for sale on the wholesale market. Naturally over time the liquid honey will begin to crystallize into a solid block. When the honey reaches the processing plants to be repackaged into container for retail sale it is put into giant hot rooms to return the honey back into a liquid so that it can be handled. From there it is heated more and filtered (removing many of the natural properties like pollen, propolus, wax etc.) and then packaged and depending on what type of honey it is going to be it may be super cooled to stimulate recrystallization.

The biggest reason for this type of processing is that the majority of the population does not like the honey that is hard because it is not spreadable or scoopable.

On the other hand there is a percentage of the population that only wants the raw honey because it is natural and unaltered. That market has grown significantly over the last five years. However the honey can be too hard depending on what time of the season the container is poured. Each different floral honey has different taste, texture, color and rate at which it crystallizes and how hard it will become.

U.S. Pat. No. 4,986,855 issued Jan. 22, 1991 by Sterling discloses a method of forming a creamed honey which can be dispensed through a nozzle of a squeeze container by admixing liquid honey with seeding crystals.

U.S. Pat. No. 5,715,747 issued Feb. 10, 1998 by Fedon discloses a method for separating a wax and honey mixture obtained by an uncapping process by feeding the mixture into an Archimedes screw to separate the materials by pressure.

U.S. Pat. No. 2,052,358 issued Aug. 25, 1936 by Lund discloses a method of whipping honey with additional ingredients to form an aerated honey whip.

U.S. Pat. No. 4,328,743 issued May 11, 1982 by Fager discloses a machine for separating honey from honeycomb cappings using two converging conveyor belts so that the honey is squeezed through openings in the belts.

SUMMARY OF THE INVENTION

It is one object of the invention to provide a method for treating honey to form a smooth spreadable product without use of heat.

According to one aspect of the invention there is provided a method for forming a soft, spreadable honey product comprising:

providing a container with a cylindrical container wall;

rotating an auger within the container with an exterior auger flight having an outer edge closely adjacent the container wall leaving a clearance therebetween;

the auger flight acting to drive material to one discharge end of the container with a discharge valve at the discharge end;

providing one or more buckets or barrels of raw solid crystalline honey and feeding the honey in solid form onto the flight of the auger to be engaged into the flight and carried toward the discharge end;

maintaining the discharge valve closed for period of time to cause the honey to be fed by the auger flight to the discharge end and to pass through the clearance along the container from the discharge end in a mixing action to effect mixing of the honey;

the mixing action being carried out until the crystals in the honey are broken down sufficiently to form the honey into the soft, spreadable honey product; the mixing action being carried out without the use of any heat at any time;

and after the mixing action opening the discharge valve to discharge the product.

Preferably the container is sufficiently large to receive a plurality of the buckets or barrels so that raw solid honey from a plurality of the buckets or barrels can be added and admixed.

The size of the equipment and particularly the container and feed chute can vary depending on the scale of production. Thus in some cases a relatively small container may be provided of the order of 20 gallons so as to be of sufficient size to receive four buckets each of 5 gallons. For larger scale production, the container may be 10 times that size to receive four commercial size barrels of the solid raw honey after storage for the season. However it will be appreciated that the method of the present invention can be used in batches of whatever size the manufacturer requires.

Preferably the plurality of buckets or barrels are taken from different times of the production season so as to contain honey from different plants. That is at the end of the production season, the collected honey from different times during the season and therefore formed from different plants is collated and admixed using the system.

Preferably the raw solid honey from one of the buckets or barrels is fed as a solid block through a feed chute onto the flight of the auger with the auger flight acting to break down the solid body by breaking away portions which are then fed forwardly by the auger flight to the mixing action at the discharge end.

It is important in this process that the raw solid honey is not filtered and is not heated so that it remains of the raw quality preferred by many users.

Typically the clearance is in the range 1/16 to 1/8 inch.

Preferably the mixing action causes the crystals to fracture.

Preferably the mixing action causes the crystals to interact with one another so as to grind them down making them smooth and small.

Preferably the auger is arranged with an axis thereof vertical so that the discharge end is at the bottom and the raw solid honey is fed from one side through a feed chute.

The arrangement as described herein provides a method and machine that not only makes a smooth, creamy, spreadable product but it also combines all the different floral honey. It also uses less energy. By mixing all the different floral honeys together the method creates a very consistent product not changing in taste, color or texture.

This method takes a solid barrel or barrels of honey and turns them into a soft, spreadable product without the use of any heat at any time of the production. The use of a slow turning auger inside a tube gently massages the honey, in the form of a rock tumbler. The essence of this process is that it acts to fracture the crystals in a cool environment so as not to change the molecular structure of the crystals. All it does is grind them down making them smooth and small. Because this is done without the use of heat the crystals will not rebind to each other leaving the finished product soft and spreadable indefinitely.

The process can be used with an all natural farm that wants to market an all natural product that doesn't have to be hard. Also because it does not require any additional heat during the creation of this product the process has less of an environmental impact than conventional processing plants.

The general concept is an auger screw inside of a pipe with a clearance between an outer edge of the flight and the inside surface of the pipe that is used to draw the hard honey in from a solid block discharged from a 5 gallon pail. The honey is drawn in and circulated by the auger, mechanically breaking up the crystalline structure of the honey. Once it has circulated long enough to produce the desired texture a ball valve on the bottom of the unit is opened and the auger pushes the honey out of the machine.

The total capacity of the current design is 20 Gallons, allowing mixing different blends of honey. The auger is turned using an electric motor and gearbox.

BRIEF DESCRIPTION OF THE DRAWINGS

One embodiment of the invention will now be described in conjunction with the accompanying drawings in which:

FIG. 1 is an isometric view of an apparatus for use in the method of the present invention.

FIG. 4 is a top plan view of the auger of the apparatus of FIG. 1.

FIG. 5 is a side elevational view of the auger of the apparatus of FIG. 1.

FIG. 6 is a cross-sectional view along the lines B-B of the apparatus of FIG. 5.

FIG. 7 is a front elevational view of the auger of the apparatus of FIG. 1.

In the drawings like characters of reference indicate corresponding parts in the different figures.

DETAILED DESCRIPTION

Figure 3:
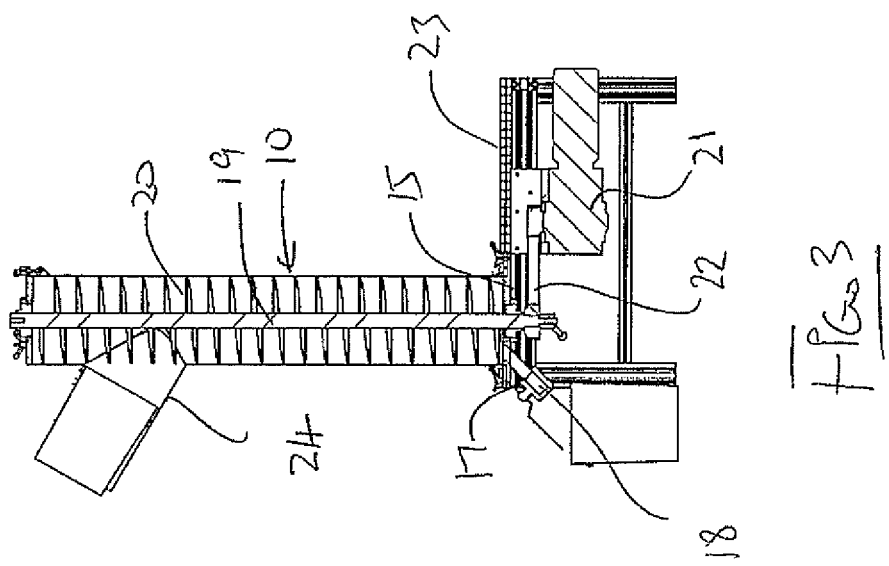
FIG. 3 is a cross-sectional view along the lines A-A of the apparatus of FIG. 2.
Figure 2:
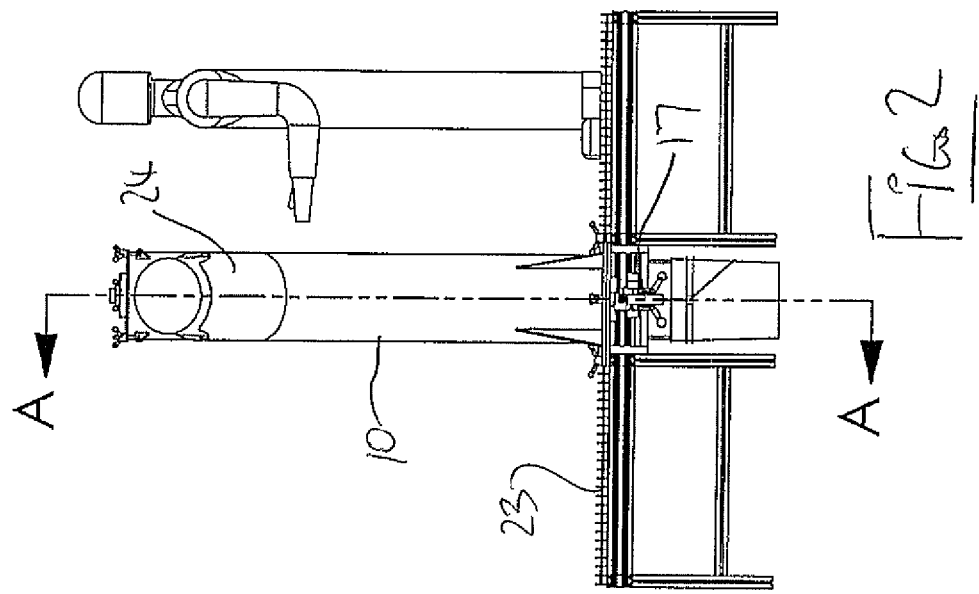
FIG. 2 is a side elevational view of the apparatus of FIG. 1.

The apparatus of the Figures comprises a vertical auger 10 with an outer container or pipe 11 having an upper end 12 with a bearing 13. The lower end 14 is closed by a base plate 15 secured by bolts and supported by braces 16. An inclined discharge pipe connects to the end plate 15 and extends downwardly and forwardly to a bottom mouth with a valve 18 so that when opened the material can discharge into a receptacle presented in front of the container.

The auger 10 includes a vertical shaft 19 within the container and supported in the bearings with an auger flight 20 carried on the shaft. The shaft is driven using an electric motor 21 and gearbox 22 including a belt or chain drive, all mounted under a floor 23 on which the operator can stand.

A feed chute 24 is welded to one side of the pipe 11 at a position adjacent to but spaced from the end wall 12. The feed chute is circular in cross-section allowing the entry into the chute of a single solid mass of raw honey dumped from a bucket, pail or barrel.

In the method, the auger flight 20 is rotated within the container 11 with an outer edge closely adjacent the container wall leaving a clearance 20A therebetween. The auger flight acts to drive the material to the discharge end 14 of the container. The discharge valve is closed for period of time to cause the honey to be fed by the auger flight to the discharge end and to pass through the clearance along the container from the discharge end in a mixing action to effect mixing of the honey.

The mixing action is carried out until the crystals in the honey are broken down sufficiently to form the honey into the soft, spreadable honey product. This is obtained by causing the crystals to fracture and to interact with one another so as to grind them down making them smooth and small.

The mixing action is carried out without the use of any heat at any time and the product remains unfiltered so as to retain all nutrients and natural materials.

After the mixing action the discharge valve is opened manually to discharge the product.

The container is sufficiently large to receive a plurality of the buckets or barrels so that raw solid honey from a plurality of the buckets or barrels can be added and admixed.

In the example shown, the container is of 20 gallons so as to be of sufficient size to receive four buckets each of 5 gallons with the buckets or barrels taken from different times of the production season so as to contain honey from different plants.

Typically the clearance is in the range 1/16 to 1/8 inch.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for forming a soft, spreadable honey product comprising:
    providing a container with a cylindrical container wall;
    rotating an auger within the container with an exterior auger flight having an outer edge closely adjacent the container wall leaving a clearance therebetween;
    the auger flight acting to drive material to one discharge end of the container with a discharge valve at the discharge end;
    feeding raw honey in solid crystalline form so as to contain crystals onto the flight of the auger to be engaged into the flight and carried toward the discharge end;
    maintaining the discharge valve closed for period of time to cause the honey to be fed by the auger flight to the discharge end and to pass through the clearance along the container from the discharge end in a mixing action to effect mixing of the honey;
    the mixing action being carried out until the crystals in the honey are broken down to form the honey into the soft, spreadable honey product;
    the mixing action being carried out without the use of any heat at any time;
    and after the mixing action opening the discharge valve to discharge the product.

2. The method according to claim 1 including mixing into the container raw solid honey from a plurality of containers which are added and admixed.

3. The method according to claim 2 wherein the plurality of containers are taken from different times of the production season so as to contain honey from different plants.

4. The method according to claim 1 wherein the raw honey is fed as a solid block through a feed chute onto the flight of the auger.

5. The method according to claim 1 wherein the raw honey is not filtered.

6. The method according to claim 1 wherein the clearance is in the range 1/16 to 1/8 inch.

7. The method according to claim 1 wherein the mixing action causes the crystals to fracture.

8. The method according to claim 1 wherein the mixing action causes the crystals to interact with one another so as to grind them down making them smooth and small.

9. The method according to claim 1 wherein the auger is arranged with an axis thereof vertical so that the discharge end is at the bottom and the raw honey is fed from one side through a feed chute.

\* \* \* \* \*